US010705196B2

(12) United States Patent
Cramer et al.

(10) Patent No.: US 10,705,196 B2
(45) Date of Patent: Jul. 7, 2020

(54) METHOD AND APPARATUS FOR MEASURING THE LENGTH OF AN ELECTRODE IN AN ELECTRIC ARC FURNACE

(71) Applicant: HATCH LTD., Mississauga (CA)

(72) Inventors: Matthew H. Cramer, Milton (CA);
Afshin Sadri, Woodbridge (CA);
Jennifer Erskine, Mississauga (CA);
David Chataway, Mississauga (CA);
Bert O. Wasmund, Milton (CA); Terry Gerritsen, Oakville (CA)

(73) Assignee: Hatch Ltd., Mississauga (CA)

( * ) Notice: Subject to any disclaimer, the term of this patent is extended or adjusted under 35 U.S.C. 154(b) by 312 days.

(21) Appl. No.: 15/812,462

(22) Filed: Nov. 14, 2017

(65) Prior Publication Data

US 2018/0067201 A1 Mar. 8, 2018

Related U.S. Application Data

(63) Continuation-in-part of application No. PCT/CA2016/050550, filed on May 13, 2016.
(Continued)

(51) Int. Cl.
*G01S 13/08* (2006.01)
*G01F 23/284* (2006.01)
(Continued)

(52) U.S. Cl.
CPC ............... *G01S 13/08* (2013.01); *F27B 3/28* (2013.01); *F27D 21/00* (2013.01); *G01F 23/284* (2013.01); *G01S 13/88* (2013.01); *F27B 3/085* (2013.01)

(58) Field of Classification Search
CPC ........ F27D 21/00; G01F 23/284; G01S 13/08; G01S 13/88
See application file for complete search history.

(56) References Cited

U.S. PATENT DOCUMENTS

2012/0097648 A1* 4/2012 Foret .................. F02C 3/14
219/121.52
2013/0127653 A1 5/2013 Dienenthal et al.

FOREIGN PATENT DOCUMENTS

WO 2014002192 1/2014

OTHER PUBLICATIONS

International Search Report and Written Opinion; Application No. PCT/CA2016/050550, dated Jul. 26, 2016.
(Continued)

*Primary Examiner* — Timothy A Brainard
(74) *Attorney, Agent, or Firm* — Ridout and Maybee LLP

(57) ABSTRACT

A method for determining a length parameter of an electrode during operation of an electric arc furnace. An internal duct extends through the length of the electrode and is open at its lower end. A waveguide having a solid core is received in the internal duct and comprises a material having a low dielectric constant and high temperature resistance. The solid core of the waveguide includes at least one target. An electromagnetic radiation signal is emitted from a source and transmitted through the waveguide and the signal is diffracted and/or reflected from at least one target to produce at least one return signal which is transmitted back through the waveguide. A time or frequency difference between the emitted signal and the return signal is measured and the length parameter is calculated based on this difference.

43 Claims, 5 Drawing Sheets

Related U.S. Application Data

(60) Provisional application No. 62/162,158, filed on May 15, 2015.

(51) Int. Cl.
| | | |
|---|---|---|
| *G01S 13/88* | (2006.01) | |
| *F27D 21/00* | (2006.01) | |
| *F27B 3/28* | (2006.01) | |
| *F27B 3/08* | (2006.01) | |

(56) References Cited

OTHER PUBLICATIONS

Ballard, Norman; Electrode Length Measurement in Electric Arc Furnaces; MSc Dissertation; Department of Electrical Engineering, University of Cape Town, Apr. 26, 1995, pp. 1-68.
International Preliminary Report on Patentability, Application No. PCT/CA2016/050550, dated Nov. 21, 2017.

* cited by examiner

METHOD AND APPARATUS FOR MEASURING THE LENGTH OF AN ELECTRODE IN AN ELECTRIC ARC FURNACE

CROSS-REFERENCE TO RELATED APPLICATIONS

This application claims priority to and the benefit of U.S. Provisional Patent Application No. 62/162,158, filed May 15, 2015, the contents of which are incorporated herein by reference. The present application is a continuation-in-part application of Application No. PCT/CA2016/050550 published as WO2016183672 A1.

FIELD OF THE INVENTION

The invention generally relates to the operation of electric arc furnaces and, more particularly, to determining an electrode tip position by measuring a length of a consumable electrode during operation of an electric arc furnace.

BACKGROUND OF THE INVENTION

A typical electric arc furnace for a melting or smelting operation comprises a refractory-lined enclosure in which feed material is melted by one or more cylindrical electrodes that pass through ports in the furnace roof. Electric power, often as arcs, is emitted from the lower ends of the electrodes to melt the charge materials and maintain a bath of molten material within the furnace. The electrode tips are gradually and continuously consumed during furnace operation. To compensate for electrode consumption, the electrodes are fed downwardly into the furnace, while new sections are added to the tops of the electrodes.

The position of the electrode tip in relation to various furnace contents, such as slag and metal bath levels, as well as the position in relation to various fixed components such as the taphole and hearth, is an important parameter for operational control of the furnace. The position of the tip in relation to these various components has a direct and appreciable effect on a measure of furnace efficiency, on an ability of the furnace to operate at the desired power input as well as on the metallurgical reactions therein. Thus, electrode tip position and control relate to production of a low cost, yet high quality product.

SUMMARY OF THE INVENTION

In one aspect, there is provided a method for determining a length parameter of an electrode during operation of an electric arc furnace containing a bath. The method comprises: (a) providing the electrode, wherein the electrode has an upper end situated outside the furnace, a lower end situated inside the furnace, a length defined from the upper end to the lower end, and an internal duct extending along the length of the electrode, wherein the internal duct is open at the lower end of the electrode; (b) providing a waveguide having a first end, a second end and a solid core, wherein the waveguide is at least partly received in the internal duct of the electrode with its second end located at or proximate to the lower end of the electrode, wherein the solid core of the waveguide includes at least one target; (c) emitting an electromagnetic radiation signal, from a source and transmitting the emitted signal through the solid core from the first end toward the second end of the waveguide; (d) diffracting and/or reflecting the emitted signal from the at least one target to produce at least one return signal and transmitting the at least one return signal through the solid core from the at least one target toward the first end of the waveguide; (e) receiving the at least one return signal from the solid core at the first end of the waveguide; (f) measuring a time or frequency difference between the emitted signal and the at least one return signal; and (g) calculating the length parameter based on this difference.

In an embodiment, the bath contains one or more molten materials selected from molten metal, molten matte, and molten slag. In an embodiment, the lower end of the electrode is in contact with the one or more molten materials in the bath.

In an embodiment, the lower end of the electrode has a tip, and the internal duct is open at the tip of the electrode. In an embodiment, the internal duct extends throughout the length of the electrode from the upper end to the lower end, and is open at the upper end of the electrode. In an embodiment, the waveguide extends throughout the length of the electrode from the upper end to the lower end. In an embodiment, the waveguide has an outer surface which is in contact with an inner wall of the internal duct.

In an embodiment, the electrode is a prebaked carbon electrode comprised of a plurality of segments joined together end-to-end. In an embodiment, the electrode is a Soderberg electrode formed by baking a carbon paste within an outer metal casing.

In an embodiment, the length parameter is selected from one or more of: the length of the electrode from its upper end to its lower end; the length of a portion of the electrode; and the position of the lower end of the electrode relative to a fixed point on the furnace. In an embodiment, the solid core comprises a plurality of segments joined together end-to-end; and the length parameter comprises the number of segments in the solid core.

In an embodiment, the at least one target comprises a tip of the solid core which is directly exposed to the molten bath at the lower end of the electrode. In an embodiment, the at least one target comprises one or more discontinuities located along a length of the solid core. In an embodiment, each of the one or more discontinuities comprises a notch or a joint.

In an embodiment, the solid core comprises a rigid, elongate bar or rod. In an embodiment, the material comprising the solid core is a ceramic. In an embodiment, the material comprising the solid core has a dielectric constant greater than the dielectric constant of air.

In an embodiment, the material comprising the solid core has a maximum use temperature with an upper limit at or below the temperature of the arc emitted by the electrode. In an embodiment, a lower limit of the maximum use temperature is about 300° C., or about 500° C.

In an embodiment, the emitted signal and the at least one return signal comprise electromagnetic radiation.

In another aspect, there is provided a method for determining a position of a slag/metal interface in a bath of an electric arc furnace relative to a fixed component of the furnace. The method comprises: (a) determining a length parameter of an electrode during operation of the electric arc furnace according to the method of any one of claims 1 to 21, wherein the length parameter is the length of the electrode from its upper end to its lower end; (b) with the lower end of the electrode located in the bath, raising or lowering the electrode; (c) monitoring one or more electrical parameters of the electrode as it is being raised or lowered; (d) continuing to raise or lower the electrode until the monitoring of the electrical parameters indicates that the lower end of the electrode has passed through the slag/metal interface; and (e) calculating the position of the slag/metal interface relative to the position of fixed component, based on the length of the electrode determined in step (a), the position of the slag/metal interface determined in step (d), and the known position of the fixed component.

In an embodiment, the fixed component of the furnace is the hearth.

In yet another aspect, there is provided an apparatus for measuring a length parameter of an electrode of an electric arc furnace. The electrode has an upper end situated outside the furnace, a lower end situated inside the furnace, a length defined from the upper end to the lower end, and an internal duct extending along the length of the electrode. The internal duct is open at the lower end of the electrode, and the apparatus comprises: (a) a waveguide having a first end, a second end, and a solid core, wherein the waveguide is adapted to be at least partly received in the internal duct of the electrode, wherein the solid core of the waveguide includes at least one target; (b) a wave generator adapted to emit an electromagnetic radiation signal into the solid core at the first end of the waveguide; and (c) a wave receiver adapted to receive an electromagnetic radiation signal from the solid core at the first end of the waveguide.

In an embodiment, the solid core comprises a plurality of segments joined together end-to-end. In an embodiment, the at least one target comprises a tip of the solid core or at least one discontinuity located along a length of the solid core. In an embodiment, the at least one discontinuity comprises at least one notch or at least one joint. In an embodiment, the solid core comprises a rigid, elongate bar or rod.

In an embodiment, the material comprising the solid core has a dielectric constant greater than the dielectric constant of air. In an embodiment, the material comprising the solid core has a maximum use temperature with an upper limit at or below the temperature of the arc emitted by the electrode. In an embodiment, a lower limit of the maximum use temperature is about 300° C.

In an embodiment, the signal comprises electromagnetic radiation and wherein the wave generator and the wave receiver are provided in a radar unit.

In an embodiment, the waveguide further comprises an outer layer surrounding the solid core, wherein the outer layer has an electrical resistivity which is less than the electrical resistivity of the solid core.

In yet another aspect there is provided a waveguide for an apparatus for measuring a length parameter of an electrode of an electric arc furnace containing a bath. The waveguide comprises an elongate solid core; wherein said elongate solid core has a maximum use temperature which has a lower limit of about 200° C. below the temperature of the bath in the vicinity of the lower end of the electrode, and an upper limit at or below the temperature of the arc emitted by the electrode.

In an embodiment, the solid core comprises a plurality of segments joined together end-to-end. In an embodiment, the solid core comprises a rigid, elongate bar or rod. In an embodiment, the material comprising the solid core is a ceramic. In an embodiment, the material comprising the solid core has a dielectric constant greater than the dielectric constant of air.

In an embodiment, the waveguide further comprises an outer layer surrounding the solid core, wherein the outer layer has an electrical resistivity which is less than the electrical resistivity of the solid core. In an embodiment, the solid core has a dielectric constant less than the dielectric constant of the surrounding outer layer. In an embodiment, the outer layer comprises a metal having a melting point of at least about 450° C.

BRIEF DESCRIPTION OF THE DRAWINGS

The invention will now be described, by way of example only, with reference to the accompanying drawings, in which.

DETAILED DESCRIPTION

Figure 1:
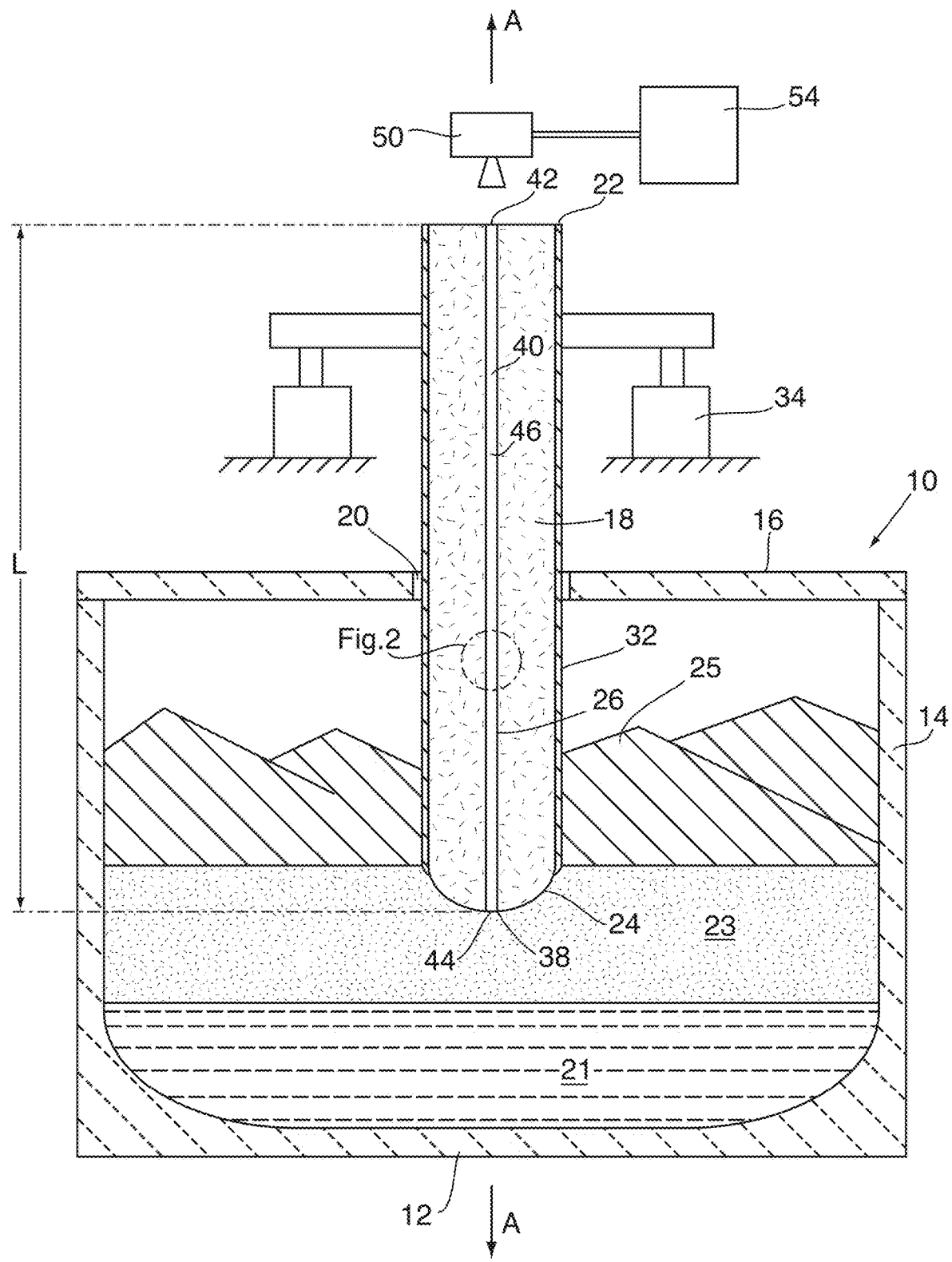
FIG. 1 illustrates, in a schematic cross-sectional view, a furnace incorporating an apparatus for measuring the length of an electrode according to an embodiment.

Currently, the operators of electric arc furnaces are unable to determine the position of the electrode tip, as the tip is often submerged beneath material "charge banks" and, on occasion, submerged in the liquid slag layer and, therefore, not visible. The operator is, however, able to determine the position of fixed mechanical support components in the upper electrode column. If the distance from the electrode tip to a known reference point on the upper electrode could be determined accurately, this length, in conjunction with the distance between the known position of the reference point and the fixed components, could be used to determine the exact position of the electrode tip relative to the fixed components.

In addition, the location of the slag/metal interface or the slag/burden interface is not known. These interface locations, if known, could be used to determine a level and an inventory of molten material in the furnace. By knowing the position of the electrode tip, operators can use a procedure known as a "sounding test" to determine the thickness of the slag layer and the matte or metal layer. "Sounding tests" are performed by monitoring the changes in electrical resistance of a probe as it moves through various molten layers within the furnace and is common practice. Knowing the thickness of the molten components in the furnace greatly assists the operators to optimize furnace operation, to reduce cost and to increase the campaign life of the furnace. "Sounding tests" are commonly conducted with a dedicated apparatus. The dedicated apparatus typically includes a robust steel rod, which is to be forced through the solid charge material and into the slag layer. Besides resulting in additional cost, these sounding rods are subject to bending and breakage by the solid burden covering the slag layer. If the electrode length was known, the electrode itself could be used as a sounding rod to determine the interface locations.

According to common practice, electrode length is empirically determined by each site and calibrated on a regular basis by emptying or "burning down" the furnace "charge banks" to expose the electrode tips, if possible, for either physical measurement or a visual estimation. This practice not only influences throughput as it requires the furnace load to be reduced but places the electrodes under unnecessary mechanical and thermal stress as well as exposing mechanical components in the furnace to extremely high heat loads due to exposed molten material. "Burning down" the furnace "charge banks" seldom exposes the full tips of the electrodes due to the limited mechanical stroke on each electrode and the depth of the furnace. As a result, even after taking these steps, the final length is generally a subjective visual estimate by the operator. Alternatively, physically measuring the length of the electrode requires the operator to insert a metal measuring bar into the furnace which not only takes time but involves several high safety risk steps to be performed, including furnace electrical isolation. This method also suffers from a high potential for errors and poor repeatability.

The inventors are aware of three commercially available and patented electrode length estimation systems. Each system uses secondary mechanical or electrical information to estimate the electrode length. Two of the commercially available systems, ELKEM ELMO and TENOVA Pyromet EBDS, rely upon measurement of weight of the entire electrode column, either through load cells or through hydraulic pressures in cylinders. U.S. Pat. No. 3,379,818, for the weighing of the electrode column, issued in 1968 and was assigned to Lectromelt Corporation. ELKEM subsequently applied for patents related to this approach, see Patent Cooperation Treaty (PCT) Application Publication No. WO 2000001996 and U.S. Pat. No. 6,330,270 B1. TENOVA Pyromet describes a similar system based on oil pressure measurement in U.S. Patent Application Publication No. 2006/0050757. Both approaches suffer from at least one major technical limitation. The key assumption behind these techniques is that the electrode and electrode column are fully supported by the mechanical components in the upper columns and, thus, these techniques rely on the assumption that the force measured, either by load cells or by oil pressure, is the full weight of the electrode and column only. It will be appreciated that, as a substantial portion of the electrode is submerged in a dense liquid bath and/or unmelted burden, dynamic and unknown buoyancy forces play a significant role in supporting the electrode and electrode column. Additionally, the installation of load cells in existing equipment is extremely challenging. PCT Application Publication No. WO 2006/089315, hereinafter "the MINTEK patent application," proposes utilizing an algorithm that is based on calculated electrical parameters in conjunction with electrode slip measurements to estimate the electrode length and, thus, tip position. The MINTEK patent application outlines the use of the electrode reactances to calculate the electrode lengths. The MINTEK patent application suggests an accuracy of 200-300 mm. For the algorithm in the MINTEK patent application to work, the reactance in each electrode is assumed to be equal. The reactance of one electrode and circuit is largely dependent on the length of the electrical path. Due to varying electrode length and furnace conditions, the lengths of the electrical paths associated with distinct electrodes are seldom equal.

Some systems have been proposed in which electrode length is measured with consumable waveguides, made of a gas-filled conductive tube, extending throughout the length of each electrode. In these systems, a pulse of electromagnetic radiation, often radar, is transmitted from the top to the bottom of the waveguide, and is diffracted and reflected back, due to the change in medium at the end of the waveguide, to a receiver located at the top of the electrode, thereby providing data that may be processed to arrive at an estimation of electrode length. In theory, the pulse of electromagnetic radiation will be diffracted and reflected back from the tip of the electrode, on the assumption that the both the electrode and the waveguide will be consumed at the same location. Examples of such systems are disclosed in U.S. Pat. No. 4,843,234(to Berthold et al.), U.S. Patent Application Publication No. 2013/0127653 A1 (to Dienenthal et al.) and PCT Application Publication No. WO 2014/002192 A1 (to Hamada et al.). The inventors believe that these systems are complex; requiring gas pressurized systems, and suffer from several technical limitations. The limitations are primarily the structural integrity of the gas-filled tube at high temperatures in a dynamic environment, as well as the likelihood that debris within the tube will result in early diffraction of the signal and overall signal loss.

Additional systems (see U.S. Pat. No. 4,843,234) have been proposed in which an optical fiber is continuously inserted into the electrode and an optical time-domain reflectometer is used to determine the distance between the source and the melted tip of the fiber by emitting infrared or visible light down the fiber. The inventors are not aware of any known commercially available optical fiber, even a protected one, which can withstand sufficient temperature to survive operationally until in close proximity to the electrode tip.

The inventors are thus aware of no accurate and cost-effective means of determining the electrode length and thus electrode tip position for a submerged electric arc furnace. There remains a need for an accurate and cost effective means of measuring the electrode length and thus determining the electrode tip position in an electric arc furnace.

A method and an apparatus for determining a length parameter and, thus, tip position of an electrode during operation of an electric arc furnace are described below with reference to the drawings.

FIG. 1 illustrates, in a simplified cross-sectional view, an electric arc furnace 10 for use in a melting or smelting operation. The furnace 10 comprises a refractory-lined enclosure defined by a bottom wall or hearth 12, side walls 14 and a roof 16. An electrode 18 passes through a port 20 in the furnace roof 16, the electrode 18 having an upper end 22 situated outside (above) the furnace 10, a lower end 24 situated inside the furnace 10, a length, L, defined from the upper end 22 to the lower end 24, and an internal duct 26 extending along the length, L, of electrode 18. The electrode 18 has a central longitudinal axis, A, which, in the illustrated embodiment, is a vertical axis. Although only one electrode 18 is shown in FIG. 1, it will be appreciated that the furnace 10 will typically include a plurality of electrodes 18.

Although not shown in FIG. 1, the electrode 18 emits electricity from its lower end 24 to melt a solid charge material 25 that is then maintained as a quantity of molten material within the furnace. The contents of the furnace are referred to herein as the "bath," which will typically contain a quantity of molten metal 21 or, alternatively, a quantity of matte, a quantity of slag 23, which may form a layer on top of the metal or matte and which will typically be molten at least in areas surrounding the electrodes, and a quantity of charge material 25, which may comprise a solid burden on top of the molten metal or matte and the slag. It will be appreciated that the composition of bath is highly variable and that the materials making up the bath may not be separated into discrete layers as shown. Typically, the lower end 24 of the electrode 18 will extend through any solid layer of charge material 25 above the bath and will contact the underlying molten material 21, 23. In most cases, the lower end 24 of electrode will be submerged in the molten slag 23 of the bath and will typically extend about 1 to 3 meters below the upper level of the charge material 25. It is the presence of these "charge banks" 25 that severely limits the operator's ability to gauge electrode tip position.

As the reaction progresses, the charge banks 25 drop and are replenished, thereby ensuring the electrode tips are always covered or hidden.

Figure 3:
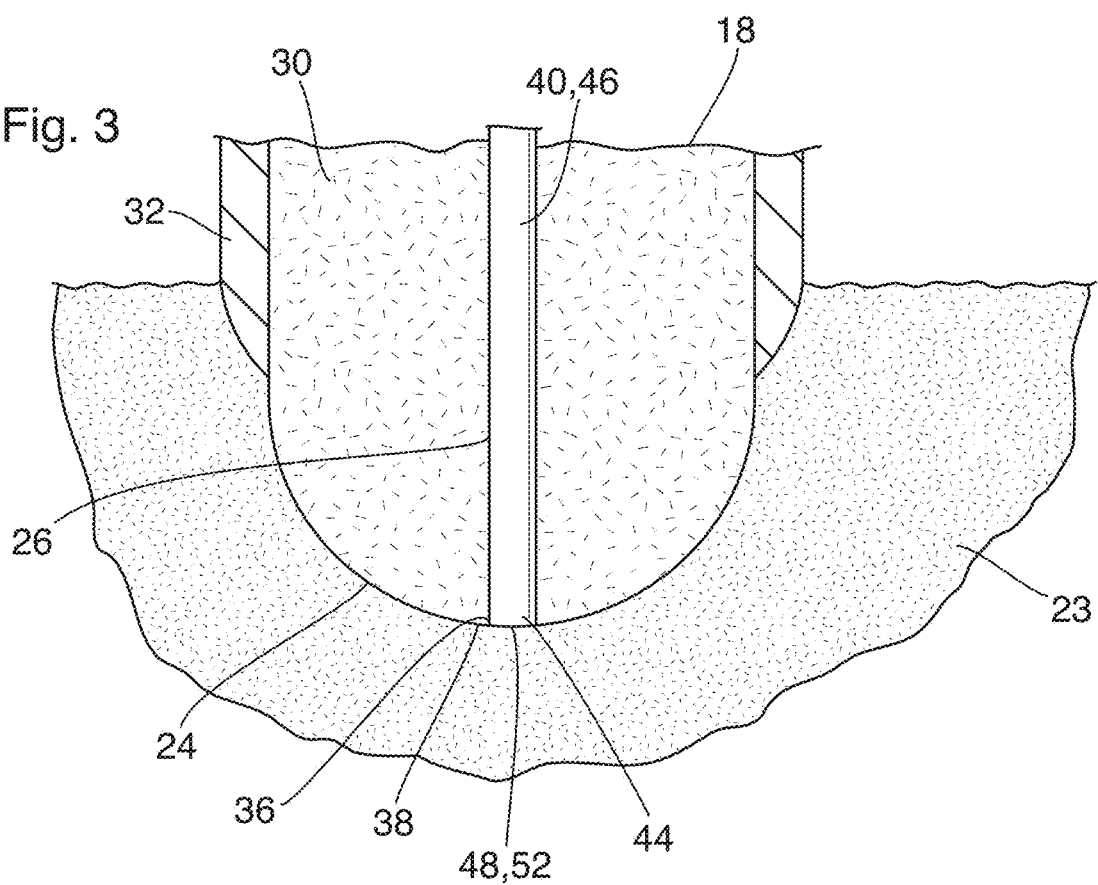
FIG. 3 illustrates, in a close-up view, the tip of the electrode of FIG. 1.

The electrode 18 illustrated in FIG. 1 can be any type of carbon electrode for an electric arc furnace. In this specific embodiment, the electrode 18 is of the "Soderberg" type, comprising a mass of solidified "baked" carbon paste 30 (see FIG. 3) surrounded by a structural metal casing 32. The furnace 10 is shown as being of the "submerged electrode" type, wherein the lower end 24 of electrode 18 is submerged in the molten slag 23. As will be discussed further below, the electrode 18 may instead be of the "prebaked" type, in which case the electrode 18 comprises a plurality of "prebaked" electrode sections in the form of solid blocks, which are mechanically connected to one another.

During operation of furnace 10, the lower end 24 of the electrode 18 is gradually and continuously consumed. To compensate for electrode consumption, the electrode 18 is fed downwardly into the furnace 10, while new sections are added to the top of the electrode 18, as will be further discussed below. FIG. 1 schematically illustrates a lowering mechanism 34 to gradually lower the electrode 18 into the furnace 10.

The internal duct 26 extends along the length of electrode 18 and has an open lower end 36 (see FIG. 3), which is located at the lower end 24 of the electrode 18. Accordingly, as shown in the close up view of FIG. 3, the open lower end 36 of the internal duct 26 is open to, and in contact with, the contents of the molten bath, which is typically either slag 23 or metal 21.

The electrode 18 is shown as having a tip 38 at its lower end 24, wherein the tip 38 may have become rounded or pointed, and may have a smaller diameter than other portions of the electrode 18. As shown, the tip 38 may be located along the central longitudinal axis A, although this is not necessarily the case.

In the embodiment of FIG. 1, the internal duct 26 is substantially co-axial with the central longitudinal axis A, such that the lower open end 36 of the internal duct 26 is located at the tip 38 of the electrode 18. However, as explained below with reference to other embodiments, this is not necessarily the case. Rather, the internal duct 26 may be spaced from the central longitudinal axis A, such that the lower open end 36 of the duct 26 is located somewhat above the tip 38, and/or in some embodiments the tip 28 may not be aligned with the central longitudinal axis A.

The embodiment of FIG. 1 also includes a waveguide 40 having a first (upper) end 42, a second (lower) end 44 and a solid core 46. The waveguide 40 is at least partly received in the internal duct 26 of the electrode 18 with the second end 44 located proximate to the lower end 24 of the electrode 18. In the illustrated embodiment, the waveguide 40 extends throughout the length L of the electrode 18 from the upper end 22 to the lower end 24. For example, as shown in the close-up of FIG. 3, the solid core 46 has a tip 48 located at the second end 44, the tip 48 may be located at the lower end 24 and/or at the tip 38 of the electrode 18 and the tip 48 may be directly exposed to the molten slag 23 or the molten metal 21 at the lower open end 36 of the internal duct 26.

The waveguide 40 has a solid core 46 having low dielectric constant (also known as "relative permittivity") and high temperature resistance. The solid core 46 is wrapped in a conductive outer layer 62. As defined herein, the term "low dielectric constant" means that the waveguide is substantially non-conductive to electricity, while permitting transmission there through of electromagnetic radiation in the radio and/or microwave spectrum. For example, the solid core 46 may be formed of a material having a dielectric constant (relative to air) that is greater than 1 but is less than the dielectric constant of the surrounding conductive outer layer 62.

The material that forms the waveguide 40 also has a low loss tangent (tan δ), which is a parameter used to quantify the amount of energy lost by an electromagnetic wave propagating through a material.

In some embodiments, the material forming the solid core 46 is a ceramic. Although a variety of types of ceramic may be used for the solid core 46, alumina-based ceramics are considered suitable according to some embodiments described herein.

As defined herein, the relative term "high temperature resistance" means that the material forming the solid core 46 has a maximum use temperature such that the material located within the internal duct 26 will melt, dissolve or disintegrate by direct contact with molten slag 23 or metal 21 at the open lower end 36 of the internal duct 26, while those portions of the solid core 46 that are shielded, from contact with the molten slag 23 or the molten metal 21, by the material of the electrode 18 will remain substantially intact. A material having such a degree of high temperature resistance will result in one possible embodiment illustrated in FIG. 3, in which the tip 48 of the solid core 46 is located at the open lower end 36 of the internal duct 26 that, depending upon the location of the internal duct 26 within the electrode 18, may be located at the tip 38 of the electrode 18 or proximate thereto. Accordingly, in the example of FIGS. 1 and 3, where the tip 48 of the solid core 46 is located at the tip 38 of the electrode 18, the length of the solid core 46 will be substantially identical to the length L of the electrode 18.

The inventors have found that forming the solid core 46 of waveguide 40 from a material having a maximum use temperature which is in close proximity to the temperature of the molten slag 23 in the vicinity of the tip 38 of the electrode 18 will ensure that the solid core 46 will melt, dissolve or disintegrate once the solid core 46 contacts the molten slag 23 at the lower end 36 of the internal duct 26, but will not significantly melt, dissolve or disintegrate before this point. For example, the maximum use temperature above which the solid core 46 melts, dissolves or disintegrates will be greater than about 300° C., more typically greater than about 500° C.

Thus, the tip 48 of the solid core 46 of the waveguide 40 having a maximum use temperature as defined above will not significantly protrude beyond the lower end 36 of the internal duct 26 into the molten slag 23, nor will the tip 48 be located a significant distance above the lower end 24, or the tip 38, of the electrode 18. This will ensure that, in one embodiment, the length of the solid core 46 of the waveguide 40 is substantially the same as the length of the electrode 18, within an acceptable and constant margin of error.

Also shown in FIG. 1 is a radiation device 50 for emitting and receiving an electromagnetic radiation signal. The radiation device 50 incorporates a wave generator adapted to emit an electromagnetic radiation signal (referred to herein as the "emitted signal") into the solid core 46 at the first end 42 of the waveguide 40. The radiation device 50 also incorporates a wave receiver adapted to receive an electromagnetic radiation signal (referred to herein as the "return signal") from the solid core 46 at the first end 42 of the waveguide 40. The return signal is produced by reflection and/or diffraction of the emitted signal within the solid core 46 of the waveguide 40, as will be further explained below. Therefore, the radiation device 50 is positioned above the first end 42 of the waveguide 40 and may be connected thereto. According to some embodiments described herein, the electromagnetic radiation signal may comprise electromagnetic radiation within the radio or microwave spectrum and the radiation device 50 comprises a radar unit.

The radiation device 50 includes a radiation source that emits the electromagnetic radiation signal into the first end 42 of the waveguide 40. The emitted signal is propagated through the solid core 46 from the first end 42 toward the second end 44 of the waveguide 40.

The solid core 46 of the waveguide 40 includes a target 52 for reflecting and/or diffracting the emitted signal to generate the return signal. The return signal is transmitted from the target 52 toward the first end 42 of the waveguide 40. The return signal is received by the wave receiver of the radiation device 50.

The radiation device 50 may measure a time or frequency variation or difference between emission of the emitted signal and reception of the return signal and this time or frequency difference may be used to determine the length parameter of the electrode. This determination may be performed by a length calculation device 54, such as a computer, which may be a separate component connected to the radiation device 50 (as shown in FIG. 1), or which may form part of the radiation device 50.

Depending on the selection of the target 52 within the solid core 46, the apparatus described herein is capable of measuring a number of different length parameters of the electrode 18.

For example, the target 52 may be located at the tip 48 of the solid core 46, due to the dissolution, melting and/or disintegration of the material of the solid core 46. Thus, at least a portion of the emitted electromagnetic radiation signal transmitted from the first end 42 of the waveguide 40 will reach the tip 48 of the solid core 46 and be reflected and/or diffracted back to the first end 42 as a return signal. By measuring a time or frequency difference between the emitted signal emitted at the first end 42 and the return signal reflected and/or diffracted from the second end 44, the total length of the waveguide 40 may be calculated. Since the material of the solid core 46 of the waveguide 40 is selected such that it has a maximum use temperature which is close to or slightly less than the temperature of the molten bath, the total length of the waveguide 40 will be closely related to the overall length of the electrode 18. Thus, according to one embodiment, a measurement of the length of the solid core 46 of the waveguide 40 will correspond to the length L of the electrode 18, within a reasonable margin of error.

In some embodiments, the solid core 46 may include one or more discontinuities between the first end 42 and the second end 44 of the waveguide 40. Each of these discontinuities may provide the target 52 that can be used to measure another length parameter of the electrode 18.

For example, in some embodiments, the solid core 46 of the waveguide 40 may include a plurality of segments 56 (see FIG. 2) joined end-to-end in a variety of ways. Where the segments 56 are mechanically connected, there will be joints 58 between adjacent segments 56. A portion of the emitted electromagnetic radiation signal being transmitted through the solid core 46 of the waveguide 40 will be diffracted and/or reflected back to the first end 42 by each of these joints 58 as a return signal and the number of these return signals will be proportional to the number of the joints 58 and, therefore, the number of the segments 56 of the waveguide 40. This type of structure may be particularly useful in prebaked electrodes, in which prebaked electrode segments are added to the upper end 22 of the electrode 18 as the lower end 24 is consumed. In this type of electrode structure, it may be advantageous to align the joints 58 of the waveguide segment 56 with the joints between adjacent electrode segments (e.g., as indicated by dotted lines 64 in FIG. 2), such that the number of the joints 58 detected by the radiation device 50 will be closely related to the number of prebaked segments making up the electrode 18.

Alternatively, the targets 52 may be other types of discontinuities that diffract and/or reflect a portion of the emitted electromagnetic radiation signal back toward the first end 42 of the waveguide 40 as the return signal. For example, the solid core 46 may be provided with notches 60 (see FIG. 2) spaced apart along its length, wherein the spacing of the notches 60 may correspond to a known length within the electrode 18. The notches 60 can be located between segments of the electrode 18, when the electrode 18 is a prebaked electrode, or the notches 60 can indicate the length of a section of a Soderberg electrode 18, for example.

In some embodiments, the length parameter which can be measured is used to determine the relative position of the tip 38 with respect to any fixed component on the furnace 10. For example, in the context of a "sounding test", the fixed point of the furnace 10 may comprise the bottom hearth refractory 12 of the furnace 10. The measurement of the length of electrode 18 permits the location of the tip 38 of the electrode 18 relative to the bottom hearth refractory 12 of the furnace 10 to be accurately determined. By monitoring the electrical parameters of the electrode 18 as the electrode 18 passes through the slag/metal interface, the exact location, relative to the hearth 12, of the interface can be determined. In this way, the thicknesses of the metal or matte and slag layers can be accurately determined without the need for a separate "sounding test" apparatus.

Figure 2:
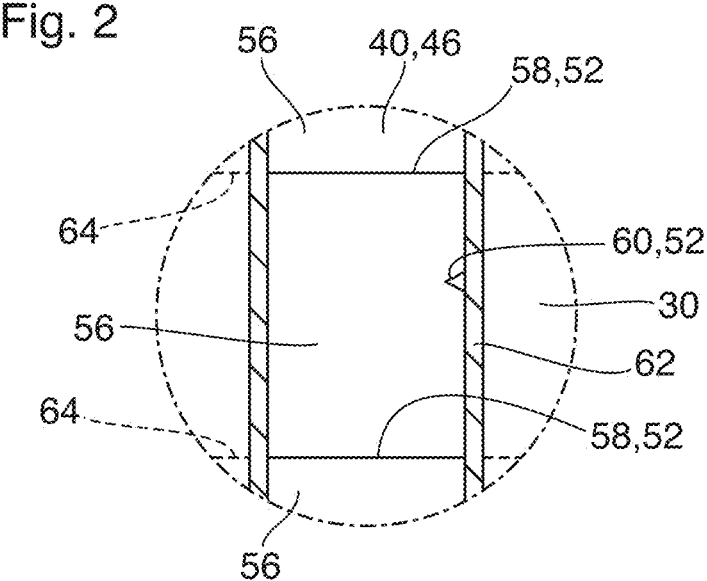
FIG. 2 illustrates, in a close-up, the circled area of FIG. 1.

As discussed, the waveguide 40 may include the conductive outer layer 62 surrounding the solid core 46, as shown in FIG. 2. The conductive outer layer 62 is electrically conductive, with an electrical resistivity (measured in $\Omega m$) that is typically less than the electrical resistivity of the solid core 46 and may be formed of metal and/or graphite. The conductive outer layer 62 may be present, for example, where the electrode 18 is a Soderberg type electrode and serves to provide an electrically conductive sheath around the solid core 46 in the upper regions of the electrode 18 where the carbon paste is not yet fully baked and may not completely surround the waveguide 40. Since the paste reaches a fully baked condition at about 450° C., the outer layer 62 may only be used up to this temperature. Therefore, the conductive outer layer 62 may be formed as a relatively thin layer of metal such as steel, copper or aluminum and may be in the form of a thin foil wrap.

Where the electrode 18 is a segmented, prebaked electrode, the waveguide 40 will be closely received within the internal duct 26 (most likely drilled through the prebaked electrode), with the outer surface of the waveguide 40 being in tight contact with an inner wall of the internal duct 26. In this construction, the walls of the internal duct 26 can serve as a conductive enclosure for the waveguide 40 and use the conductive outer layer 62 may be avoided.

Figure 4:
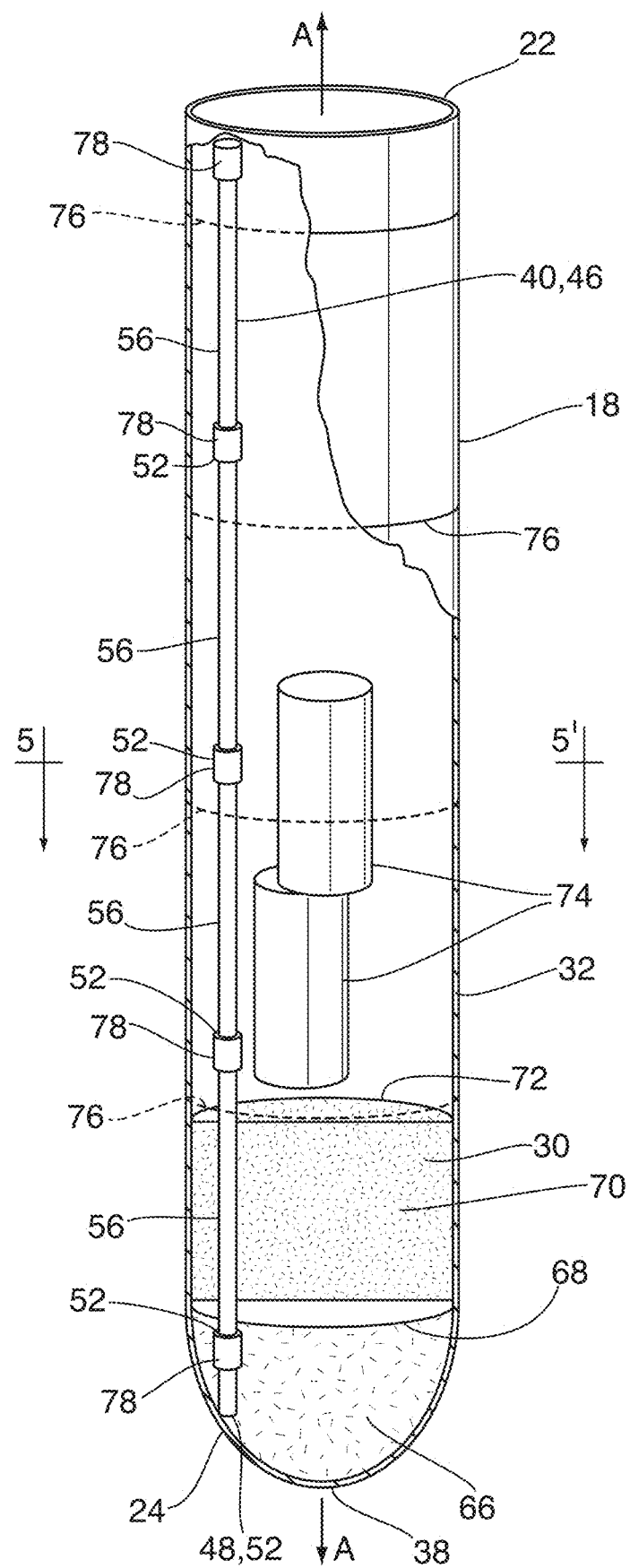
FIG. 4 illustrates, in a schematic perspective view, a waveguide, as described herein, incorporated into a Soderberg electrode.
Figure 5:
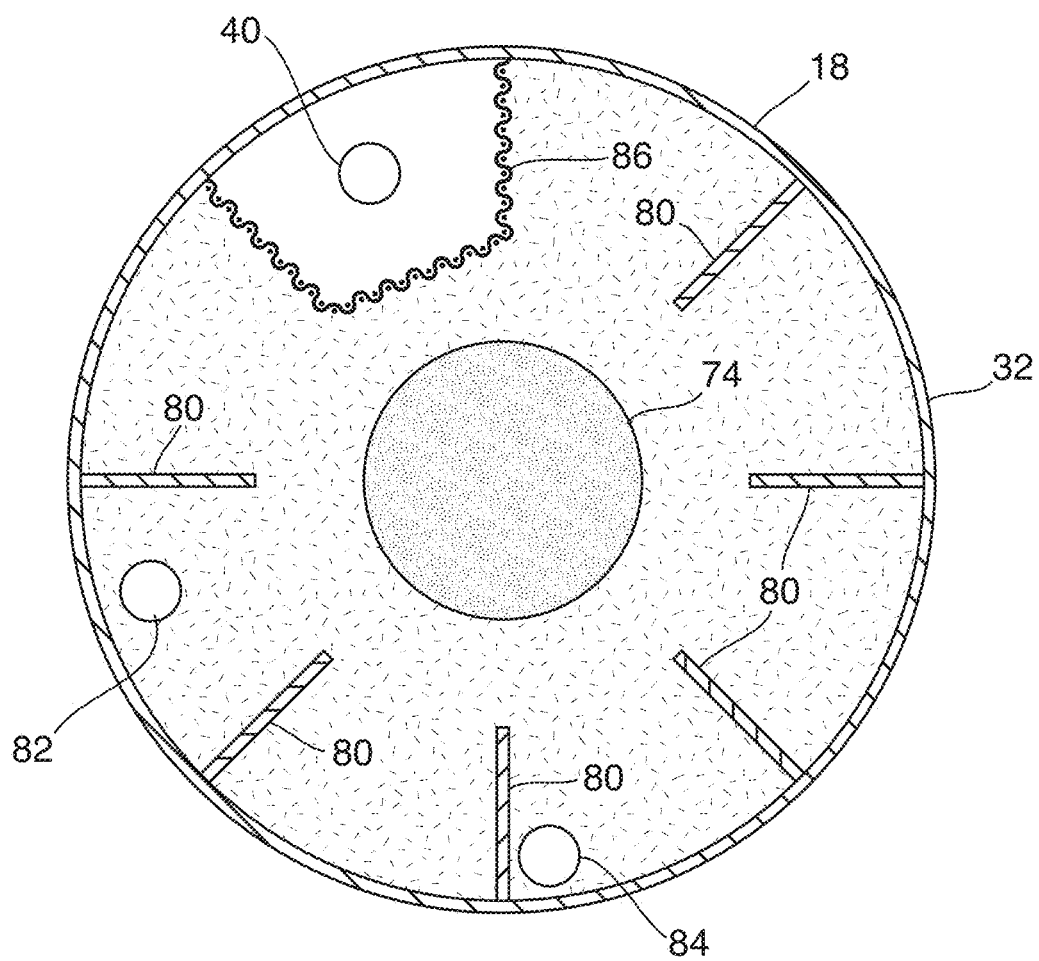
FIG. 5 illustrates a cross-section along line 5-5' of FIG. 4.

FIGS. 4 and 5 illustrate further detail regarding the incorporation of the waveguide 40, as described herein, into the electrode 18 of the Soderberg type. As illustrated, the electrode 18 comprises the carbon paste 30 enclosed within the structural metal casing 32 (the metal may be steel), both of which are consumed in the furnace 10 (not shown in FIG. 4). The fully baked carbon paste is identified by reference numeral 66 in FIG. 4 and is located in the area below dotted lines 68. Above dotted lines 68 is a region of soft paste, identified by reference numeral 70 in FIG. 4, and above a line 72 is a region in which the structural metal casing 32 is filled with cylinders 74 or blocks 74 of hard paste, which will become softened and baked as the electrode 18 is lowered into the furnace. Joints between segments of the structural metal casing 32 are identified in FIG. 4 by reference numeral 76.

FIG. 4 also shows the waveguide 40 having the solid core 46 as described above. The solid core 46 is segmented and adjacent segments 56 of the solid core 46 are shown as being connected by couplings 78, which may comprise integrated ceramic sleeves having the same or similar composition as the solid core 46. As shown, the segments 56 of the solid core 46 may have the same or similar length as the segments of the structural metal casing 32, and therefore measurement of the number of segments 56 making up the solid core 46 will provide an accurate measurement of the number of segments making up the structural metal casing 32 of the electrode 18.

From FIGS. 4 and 5 it can be seen that the waveguide 40 is parallel to the central longitudinal axis A but is spaced from the axis A. Therefore, while the tip 48 of the solid core 46 is located in the lower end 24 of the electrode 18, the tip 48 of the solid core 46 is not located at the tip 38 of the electrode 18. However, since the lower end 24 of the electrode 18 is proximate to the tip 38, and because the distance between the tip 48 of the solid core 46 and the tip 38 of the electrode 18 is known or can accurately be predicted, the provision of the waveguide 40 in an offset location relative to the axis A does not significantly affect the accuracy of the length measurement of the electrode 18.

FIG. 5 also shows the offset location of the waveguide 40 in the electrode 18 and shows the locations of a number of other potential components of the electrode 18. In this regard, FIG. 5 shows that the structural metal casing 32 may include longitudinal fins 80 extending radially inward from the structural metal casing 32. FIG. 5 also shows a location for a Cavigli device 82 and a location for a thermocouple 84, both of which may be installed in ducts extending along the length of the electrode 18. In addition, FIG. 5 shows that the waveguide 40 may, instead, be enclosed in a protective cage 86, which may be constructed of expanded metal mesh.

Figure 6:
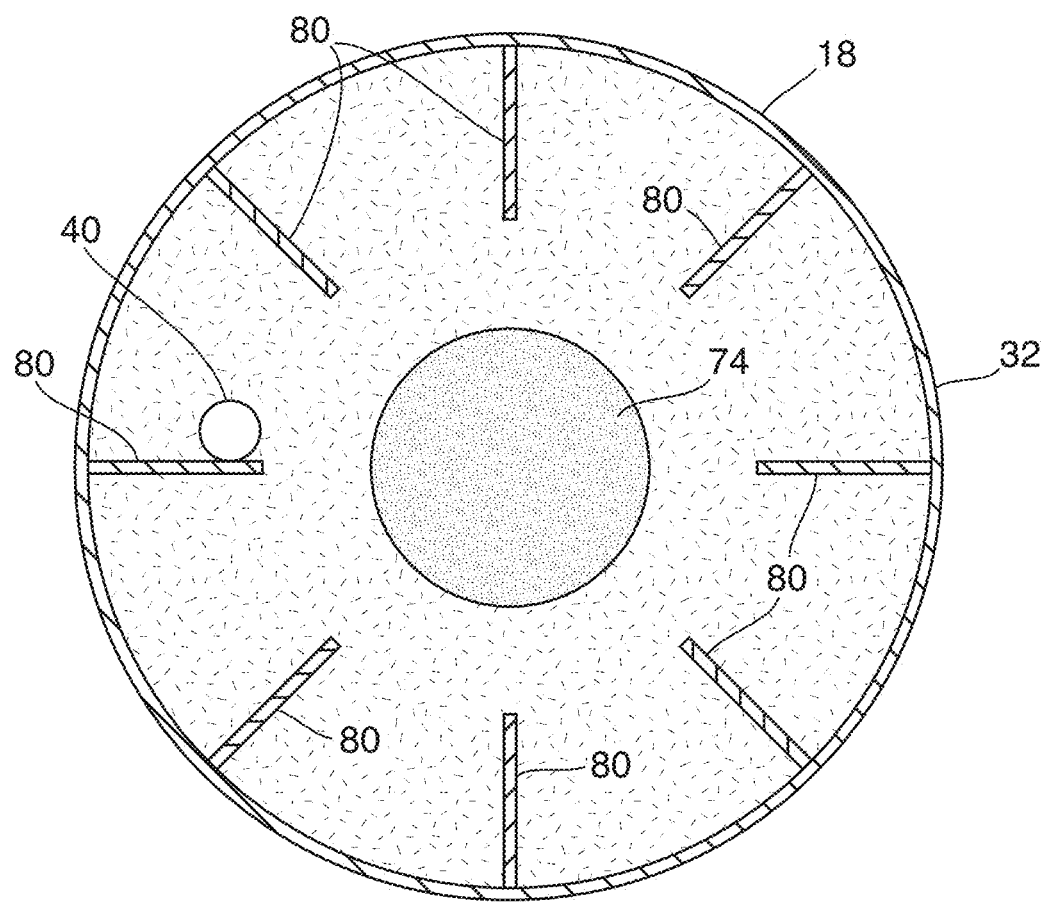
FIG. 6 illustrates a cross-section along line 5-5' of FIG. 4, as an alternative to the cross-section of FIG. 5.

FIG. 6 shows that, in a contemplated alternate design, the waveguide 40 in the electrode 18 may be affixed in some manner to at least one of the longitudinal fins 80. The waveguide 40 may be affixed at any location on the longitudinal fins 80.

In the foregoing, the solid core 46 of the waveguide 40 is described as extending through the internal duct 26 to approximately the lower end 24 of the electrode 18. Given that a typical length for the electrode 18 is in a range extending from 10 meters to 25 meters, for this design, the length for the solid core 46 would also be in a range extending from 10 meters to 25 meters.

It is further contemplated that, in an alternate design, the length for the solid core 46 may, instead, be in a range extending from 0.5 meters to 1.5 meters. To be clear, it is contemplated that the conductive outer layer 62 defining a part of the waveguide 40 will continue to extend from the first end 42 of the waveguide 40 to the second end 44 of the waveguide 40 and that the second end 44 of the waveguide 40 would remain located proximate to the lower end 24 of the electrode 18. In this alternate design, the solid core 46 extends down from the first end 42 of the waveguide 40.

Although the invention has been described in connection with certain embodiments, it is not limited thereto. Rather, the invention includes all embodiments which may fall within the scope of the following claims.

What is claimed is:

1. A method for determining a length parameter of an electrode during operation of an electric arc furnace containing a bath, the method comprising:
   (a) providing the electrode, wherein the electrode has an upper end situated outside the furnace, a lower end situated inside the furnace, a length defined from the upper end to the lower end, and an internal duct extending along the length of the electrode, wherein the internal duct is open at the lower end of the electrode;
   (b) providing a waveguide having a first end, a second end and a solid core, wherein the waveguide is at least partly received in the internal duct of the electrode with its second end located at or proximate to the lower end of the electrode, wherein the solid core of the waveguide includes at least one target;
   (c) emitting an electromagnetic radiation signal, from a source and transmitting the emitted signal through the solid core from the first end toward the second end of the waveguide;
   (d) diffracting and/or reflecting the emitted signal from the at least one target to produce at least one return signal and transmitting the at least one return signal through the solid core from the at least one target toward the first end of the waveguide;
   (e) receiving the at least one return signal from the solid core at the first end of the waveguide;
   (f) measuring a time or frequency difference between the emitted signal and the at least one return signal; and
   (g) calculating the length parameter based on this difference.

2. The method according to claim 1, wherein the bath contains one or more molten materials selected from molten metal, molten matte, and molten slag.

3. The method according to claim 2, wherein the lower end of the electrode is in contact with the one or more molten materials in the bath.

4. The method according to claim 1, wherein the lower end of the electrode has a tip, and wherein the internal duct is open at the tip of the electrode.

5. The method according to claim 1, wherein the internal duct extends throughout the length of the electrode from the upper end to the lower end, and is open at the upper end of the electrode.

6. The method according to claim 1, wherein the waveguide extends throughout the length of the electrode from the upper end to the lower end.

7. The method according to claim 1, wherein the waveguide has an outer surface which is in contact with an inner wall of the internal duct.

8. The method according to claim 1, wherein the electrode is a prebaked carbon electrode comprised of a plurality of segments joined together end-to-end.

9. The method according to claim 1, wherein the electrode is a Soderberg electrode formed by baking a carbon paste within an outer metal casing.

10. The method according to claim 1, wherein the length parameter is selected from one or more of: the length of the electrode from its upper end to its lower end; the length of a portion of the electrode; and the position of the lower end of the electrode relative to a fixed point on the furnace.

11. The method according to claim 1, wherein the solid core comprises a plurality of segments joined together end-to-end; and wherein the length parameter comprises the number of segments in the solid core.

12. The method according to claim 1, wherein the at least one target comprises a tip of the solid core which is directly exposed to the molten bath at the lower end of the electrode.

13. The method according to claim 1, wherein the at least one target comprises one or more discontinuities located along a length of the solid core.

14. The method according to claim 13, wherein each of the one or more discontinuities comprises a notch or a joint.

15. The method according to claim 1, wherein the solid core comprises a rigid, elongate bar or rod.

16. The method according to claim 1, wherein the solid core comprises a ceramic material.

17. The method according to claim 1, wherein the solid core comprises a material having a dielectric constant greater than the dielectric constant of air.

18. The method according to claim 1, wherein the solid core comprises a material having a maximum use temperature with an upper limit at or below the temperature of the arc emitted by the electrode.

19. The method according to claim 18, wherein a lower limit of the maximum use temperature is about 300° C.

20. The method according to claim 18, wherein the lower limit of the maximum use temperature is about 500° C.

21. The method according to claim 1, wherein the emitted signal and the at least one return signal comprise electromagnetic radiation.

22. A method for determining a position of a slag/metal interface in a bath of an electric arc furnace relative to a fixed component of the furnace, the method comprising:
(a) determining a length parameter of an electrode during operation of the electric arc furnace according to the method of claim 1, wherein the length parameter is the length of the electrode from its upper end to its lower end;
(b) with the lower end of the electrode located in the bath, raising or lowering the electrode;
(c) monitoring one or more electrical parameters of the electrode as it is being raised or lowered;
(d) continuing to raise or lower the electrode until the monitoring of the electrical parameters indicates that the lower end of the electrode has passed through the slag/metal interface; and
(e) calculating the position of the slag/metal interface relative to the position of fixed component, based on the length of the electrode determined in step (a), the position of the slag/metal interface determined in step (d), and the known position of the fixed component.

23. The method according to claim 22, wherein the fixed component of the furnace is the hearth.

24. An apparatus for measuring a length parameter of an electrode of an electric arc furnace, wherein the electrode has an upper end situated outside the furnace, a lower end situated inside the furnace, a length defined from the upper end to the lower end, and an internal duct extending along the length of the electrode, wherein the internal duct is open at the lower end of the electrode, the apparatus comprising:
(a) a waveguide having a first end, a second end, and a solid core, wherein the waveguide is adapted to be at least partly received in the internal duct of the electrode, wherein the solid core of the waveguide includes at least one target;
(b) a wave generator adapted to emit an electromagnetic radiation signal into the solid core at the first end of the waveguide; and
(c) a wave receiver adapted to receive an electromagnetic radiation signal from the solid core at the first end of the waveguide.

25. The apparatus according to claim 24, wherein the solid core comprises a plurality of segments joined together end-to-end.

26. The apparatus according to claim 24, wherein the at least one target comprises a tip of the solid core or at least one discontinuity located along a length of the solid core.

27. The apparatus according to claim 26, wherein the at least one discontinuity comprises at least one notch or at least one joint.

28. The apparatus according to claim 24, wherein the solid core comprises a rigid, elongate bar or rod.

29. The apparatus according to claim 24, wherein the solid core comprises a material having a dielectric constant greater than the dielectric constant of air.

30. The apparatus according to claim 24, wherein the solid core comprises a material having a maximum use temperature with an upper limit at or below the temperature of the arc emitted by the electrode.

31. The apparatus according to claim 30, wherein a lower limit of the maximum use temperature is about 300° C.

32. The apparatus according to claim 24, wherein the signal comprises electromagnetic radiation and wherein the wave generator and the wave receiver are provided in a radar unit.

33. The apparatus according to claim 24, wherein the waveguide further comprises an outer layer surrounding the solid core, wherein the outer layer has an electrical resistivity which is less than the electrical resistivity of the solid core.

34. The apparatus according to claim 24, wherein the waveguide is located inside of the electrode.

35. The according to claim 24, wherein the structural metal casing includes longitudinal fins extending radially inward from the structural metal casing and the waveguide is affixed to at least one of the longitudinal fins.

36. A waveguide for an apparatus for measuring a length parameter of an electrode of an electric arc furnace containing a bath, the waveguide comprising:
an elongate solid core;
wherein said elongate solid core has a maximum use temperature which has a lower limit of about 200° C. below the temperature of the bath in the vicinity of the lower end of the electrode, and an upper limit at or below the temperature of the arc emitted by the electrode.

37. The waveguide according to claim 36, wherein the solid core comprises a plurality of segments joined together end-to-end.

38. The waveguide according to claim 36, wherein the solid core comprises a rigid, elongate bar or rod.

39. The waveguide according to claim 36, wherein the solid core comprises a ceramic material.

40. The waveguide according to claim 36, wherein the solid core comprises a material having a dielectric constant greater than the dielectric constant of air.

41. The waveguide according to claim 36, further comprising an outer layer surrounding the solid core, wherein the outer layer has an electrical resistivity which is less than the electrical resistivity of the solid core.

42. The waveguide according to claim 41, wherein the solid core has a dielectric constant less than the dielectric constant of the surrounding outer layer.

43. The waveguide according to claim 41, wherein the outer layer comprises a metal having a melting point of at least about 450° C.

\* \* \* \* \*